United States Patent [19]
DeCarlo

[11] Patent Number: 5,179,932
[45] Date of Patent: Jan. 19, 1993

[54] COLLAPSIBLE PICNIC COOK-STOVE

[76] Inventor: Donald J. DeCarlo, Post Office Box 152, Tarrytown, N.Y. 10591

[21] Appl. No.: 892,795

[22] Filed: Jun. 3, 1992

[51] Int. Cl.⁵ .......................... A47J 37/07; F24B 3/00; F24C 1/16
[52] U.S. Cl. ..................... 126/9 R; 99/449; 99/450; 126/25 R; 126/25 A
[58] Field of Search ................. 99/449, 450, 340, 482; 126/9 R, 9 B, 25 R, 25 A, 26, 29, 30

[56] References Cited
U.S. PATENT DOCUMENTS

| | | | |
|---|---|---|---|
| 1,246,622 | 11/1917 | Lightfoot | 99/340 |
| 2,424,665 | 7/1947 | Pope, Sr. | 126/9 R |
| 3,064,637 | 11/1962 | Thomson | 126/9 R |
| 3,105,483 | 10/1963 | Bryan | 126/9 R |
| 3,559,565 | 2/1971 | Getz | 99/340 |
| 3,828,759 | 8/1974 | Cooper | 126/25 R |
| 4,191,160 | 3/1980 | Elliott | 99/450 |
| 4,211,206 | 7/1980 | Darbo | 99/449 |
| 4,599,988 | 7/1986 | Madurski | 126/25 R |
| 4,621,608 | 11/1986 | Lee | 126/25 A |
| 4,920,873 | 5/1990 | Stevens | 99/449 |

FOREIGN PATENT DOCUMENTS 2233547 1/1991 United Kingdom ................. 99/450

Primary Examiner—Timothy F. Simone

[57] ABSTRACT

A collapsible picnic cook-stove comprising, in combination with a disposable pan-shaped fuel holding member for burning fuel, a first ring-shaped support defining an opening and to which are pivotally connected three or more circumferentially spaced legs. The legs function in an extended position to support the cook-stove in spaced relation to the surface on which the cook-stove is to be used and in a collapsed position lie substantially parallel with the plane of the opening and radially inwards of said first ring-shaped support. A comestible support is pivotally connected to the first ring-shaped support to overlie in one position the opening for cooking. A second ring-shaped support is constructed and arranged to receive and support the fuel holding member in suspension below the opening of the first ring-shaped support by three or more flexible chains. The first and second ring-shaped supports are dimensioned so that the second ring-shaped support nests within the first ring-shaped support when the fuel holding member is removed from engagement with the second ring-shaped support and the first and second ring-shaped supports are moved relative to each other.

20 Claims, 3 Drawing Sheets

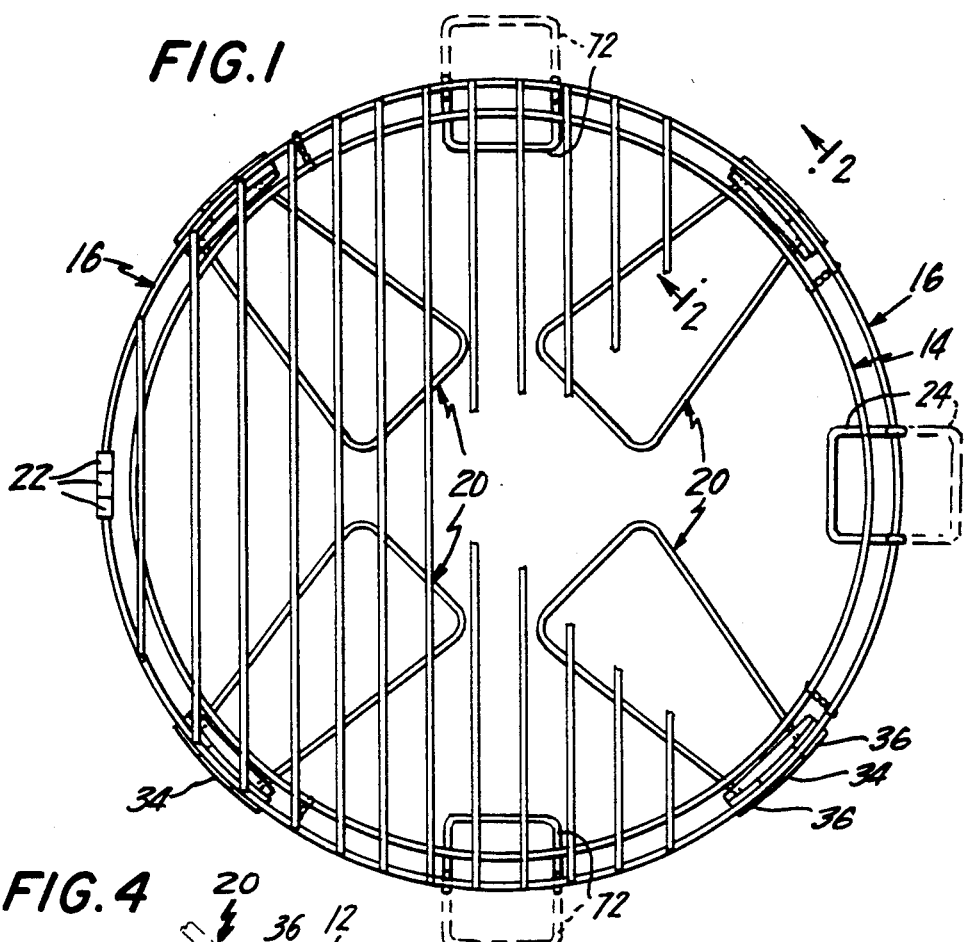
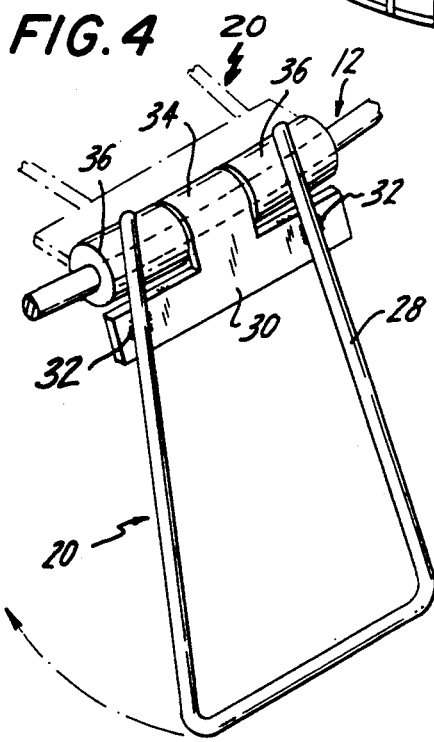
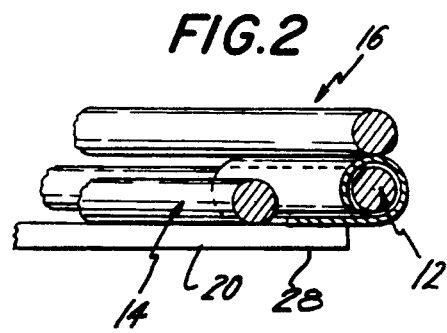
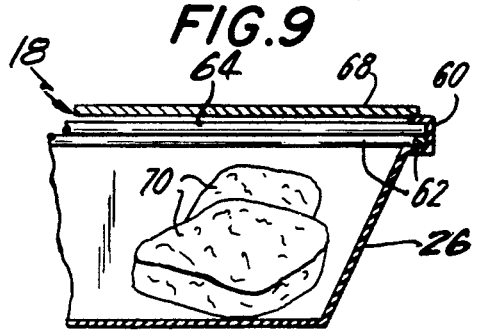

COLLAPSIBLE PICNIC COOK-STOVE

This invention relates to cook-stoves and, more particularly collapsible cook-stoves suitable for use when camping, picnicing, hiking and other outdoor activities where the participants desire to cook.

BACKGROUND OF THE INVENTION

Heretofore, cook-stoves of the collapsible type have been proven not to be practical for outdoor activities involving hiking, camping or picnicing for one or more reasons of weight, bulk, complexity and cost. Prior art cook-stoves are exemplified in the following U.S. Pat. Nos.; 2,424,665 Pope, Sr., Jul. 29, 1947; 3,105,483 Bryan, Oct. 1, 1963; 3,682,154 Mollere, Aug. 8, 1972; 4,154,863 Kates, et al., Mar. 10, 1981; 4,599.988 Madurski, Jul. 15, 1986; 4,621,608 Lee, Nov. 11, 1986.

The aforesaid prior art cook-stove of Pope, Sr. is too bulky for easy carrying by hikers and campers. Also, the cook-stove of Pope Sr. does not provide a disposable fuel holder and fire pan and therefore in the collapsed condition the cook-stove is bulky. Similarly, the disposable barbecue of the patent to Kates, et al, having a fixed wire stand is also too bulky for ease of carriage by hikers. The disposable cook-stove the Mollere patent obviously is not intended to be very durable and since it has cardboard elements is likely to have limited use in rainy whether. The cook-stoves of Lee, Bryan and Madurski patents are relatively complex, bulky and expensive and therefore not readily suited for use by campers and hikers.

In view of the foregoing, the present invention contemplates providing a collapsible cook-stove which is foldable into a small, light-weight package easy to carry, durable, and easily erected for use. Another object of this invention is to provide a collapsible cook-stove which is quickly and easily erectable and collapsible without the use of any tools or need for mechanical aptitude on the part of the user. A further object of this present invention is to provide a collapsible cook-stove which is capable of utilizing a fuel holder and fire pan which is disposable and replaceable.

SUMMARY OF THE INVENTION

The invention, therefore, contemplates a collapsible picnic cook-stove assembly comprising, more or less, in combination with a fuel holder and fire pan (hereinafter referred to as "fuel holder") for supporting fuel for burning, a first support element defining an opening and having leg means pivotally connected thereto for supporting, in one position, the first support element in spaced relationship with the surface on which the cook-stove is to be used and, in another position to lie in a plane substantially parallel with the plane of the opening of the first support element. A comestible support means for supporting that which is to be heated is supported by said first support element to overlie said opening. A second support element is provided for supporting the fuel holder. The assembly has a connecting means for interconnecting the first support and the second support elements so that the second support element is suspended by the first support element below and in spaced relationship to the comestible support means and said opening. The connecting means is constructed and arranged for permitting the second support element to be moved from the position of suspension of the fuel holder to a position in nested relationship with said first support element.

A feature of this invention is that the first and second support elements are rings interconnected by three or more circumferentially spaced chains.

BRIEF DESCRIPTION OF THE DRAWINGS

The invention will be more fully understood from the following detailed description thereof when considered in connection with the accompanying drawings wherein one embodiment of the invention is illustrated by way of example, and in which:

FIG. 1 is a top plan view of the cook-stove according to this invention shown in the folded or collapsed position, some parts being broken away for illustration purposes only;

FIG. 2 is a cross sectional view taken substantially along line 2—2 of FIG. 1, somewhat enlarged;

FIG. 4 is a fragmentary view in perspective of one of the leg members;

FIG. 9 is a fragmentary view in cross section of the fuel holder shown in FIG. 3.

DESCRIPTION OF THE PREFERRED EMBODIMENT

Figure 3:
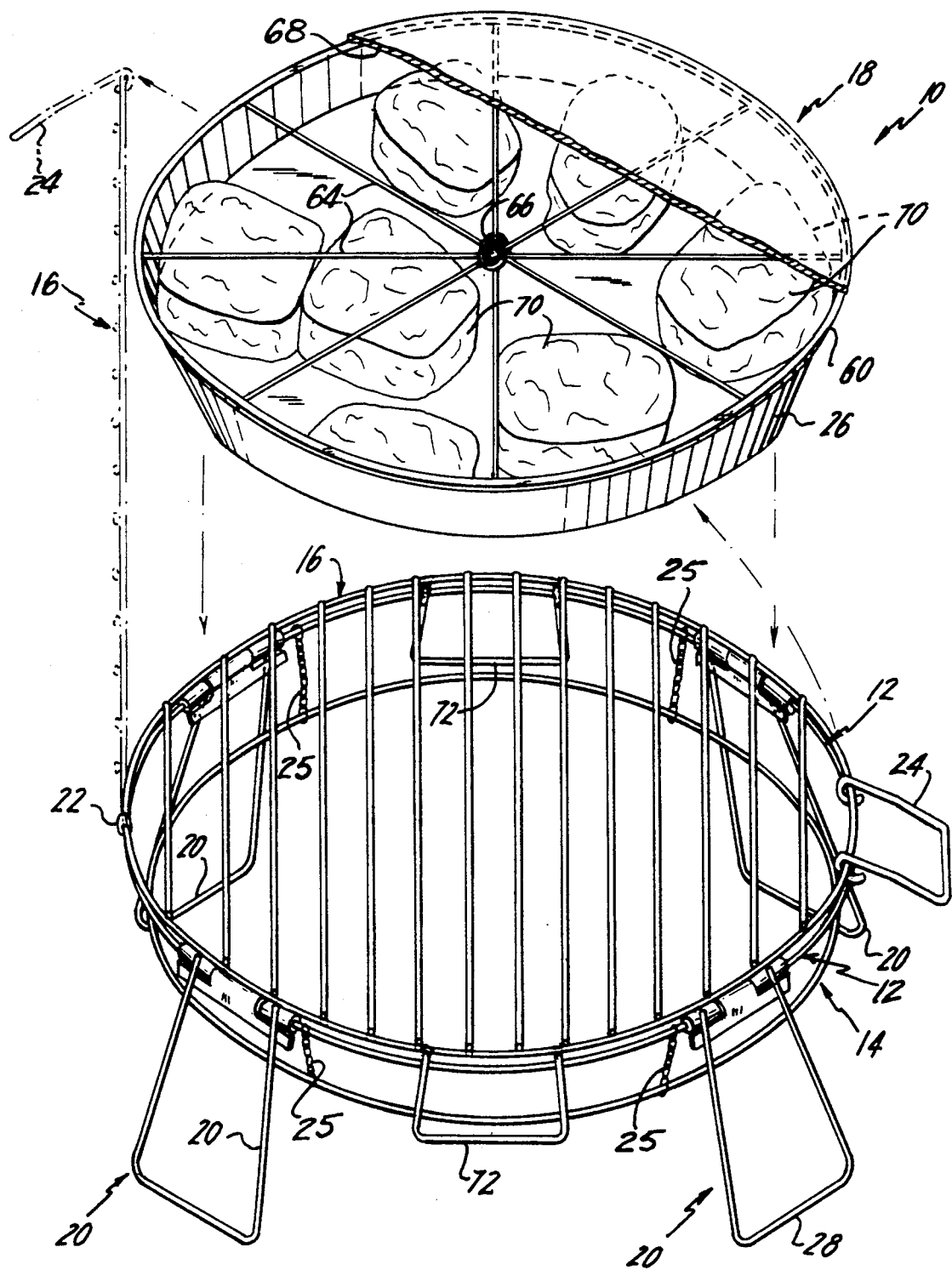
FIG. 3 is an exploded view in perspective showing the cook-stove of this invention in the unfolded or operational position.
Figure 5:
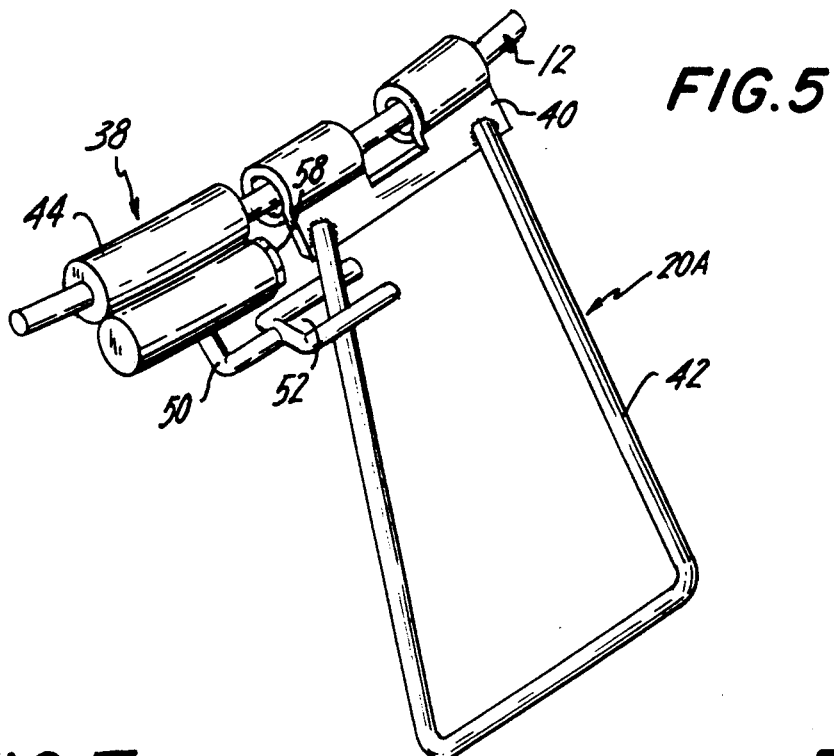
FIG. 5 is a fragmentary view in perspective of an alternative leg member.

Now referring to the drawings and more particularly FIGS. 1 and 3, the reference number 10 generally designates the cook-stove according to this invention and, as best shown in FIG. 3, comprises in general, a first support element 12, a second support element 14, a comestible support member 16 and a removable and replaceable fuel holder 18.

Figure 10:
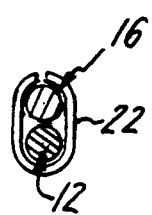
FIG. 10 is an enlarged cross sectional view of the hinge connector between the first ring support and the grill.
Figure 8:
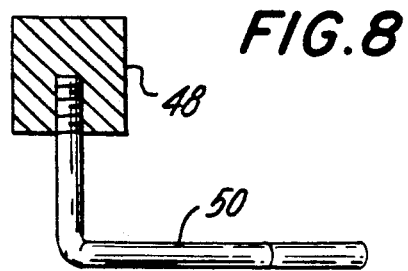
FIG. 8 is an enlarged cross sectional view of the spring loaded lock element shown in FIGS. 5, 6, and 7.

The support element 12, is shown as a circular ring (hereinafter referred to as "main support ring 12") to which are pivotally secured three or more legs 20. Also pivotally secured to main supporting ring 12 is comestible support element 16, which, as shown, may be a grill. The grill 16 is dimensioned to be substantially the same size as support ring 12 so that, in the operative or cooking position shown in FIG. 3, the support ring 12 holds the grill over the opening defined by support ring 12. The pivotal connection of grill 16 to support ring 12 is best shown in FIGS. 1 and 10 and consists of one or more metal clips 22 which are deformed to loosely embrace support ring 12 and grill 16. Obviously, it is within the purview of this invention that any form of inexpensive pivotal connection may be employed in place of clips 22. To facilitate pivotal movement of grill 16 from the fuel line position shown in FIG. 3 to the dot-dash position in the direction of the arrow, a handle 24 is provided diametrically opposite the metal clips 22.

The second ring shaped element 14 (hereinafter referred to as the "secondary support ring") is connected to main support ring 12 by three or more chains 25. Each of the chains are sufficiently flexible to allow support rings 12 and 14 to be easily moved relative to each other between the positions where they are nested (as shown in FIGS. 1 and 2) and where secondary support ring 14 is suspended in spaced relation to main support ring 12 (see FIG. 3). As is best shown in FIGS. 1 and 2 main support ring 12 is of larger diametral size than secondary support ring 14 so that in the collapsed condition of cook-stove 10 the latter nests within main support ring 12. The size of secondary support ring 14 is such that it is not only smaller than main support ring 12 but it is larger than the smallest diametral dimension of the tapered side wall 26 of fuel holder 18 or any other suitable fuel holder, as for example, the combustion package disclosed in U.S. Pat. No. 4,953,533 dated Sep. 4, 1990, to receive the fuel holder 18 therein. However, the diametral dimension of secondary support ring 14 is less than the largest diametral dimension of side wall 26, of fuel holder 18 herein shown so that when the fuel holder 18 is inserted within secondary support ring 14, the latter embraces and grips tapered side wall 26 to thereby support fuel holder 18 in suspension below grill 16.

The cook-stove 10 is supported on a surface where cooking is to occur by legs 20, each of which is pivotally connected to main support ring 12. As best shown in detail in FIG. 4, each leg comprises a "U" shaped rod 28 and a pivot plate 30. The pivot plate 30 is a T-shaped plate with the leg portion 34 bent to embrace main support ring 12. The "U" shaped rod 28 inwardly of the distal ends are welded at 32 or otherwise suitably secured by a high temperature adhesive to the crossbar portion of pivot plate 30. Since the main support ring is curved, the bent leg portion of 34 loosely embraces main support ring so that rotary movement around main support ring 12 is not hindered. At opposite ends of bent leg portion 34 are guide sleeves 36 which are welded or otherwise suitably secured to main support ring 12 to thereby maintain the circumferential position of leg 20 on main support ring 12. The guide sleeves also serve as stops to limit the extent of the open position of each leg by the abutment of the ends of "U" shaped rod 28 against the sleeves and this prevent, when the cook-stove 10 is in use, unintentional collapse thereof. As best shown in FIGS. 1 and 2 the crossbar position of pivot plate 30 is constructed and arranged to fit within the annular space between the nested main and secondary rings 12 and 14 when legs 20 are folded radially inwardly of main support ring 12 to a collapsed position.

Figure 7:
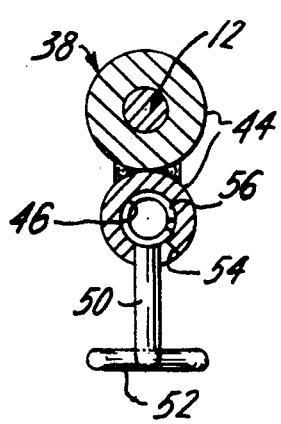
FIG. 7 is a cross sectional view taken along line 7—7 of FIG. 6.
Figure 6:
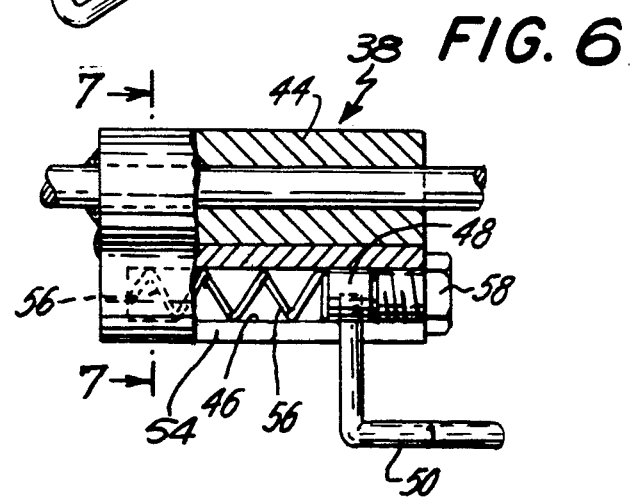
FIG. 6 is an enlarged view of the locking mechanism shown in FIG. 5 with part broken away for illustration purposes.

In FIGS. 5 to 8, inclusive, is shown an alternative leg assembly 20A which coacts with a lock member 38 to secure leg 20A in the operative or unfolded position. Each leg 20A comprises a pivot plate 40 and a "U" shaped rod 42. The pivot plate 40 is "U" shaped with the legs thereof deformed around main support ring 12 to loosely embrace the same and thereby permit free rotation about main support ring 12. The "U" shaped rod 42 is suitably secured at the distal ends of the legs thereof to pivot plate 40. The lock member 38 comprises a housing 44 fixedly secured to main support ring 12 adjacent one side of leg 20A. The housing 44, as best shown in FIGS. 6 and 7, has an elongated bore 46 in which a slide member 48 is receivable for slidable movement. A locking element 50 is secured in slide member 48. The locking element 50 is L-shaped with one end bifurcated to form an open-ended slot 52. The opposite end of locking element 50 is secured in slide member 48 and extends through a slot 54 in housing 44. A spring 56 is disposed in bore 46 to bias slide 48 to the right as viewed in FIG. 6 and hence locking element 50 is held in the locked position shown in FIG. 5. A bolt 58 which is turned into a threaded end portion of bore 48 functions to confine slide member 48 for reciprocative movement in bore 46. In the locked position, shown in FIG. 5, leg 20A is fixed against pivotal movement in both directions by the bifurcated end. To pivot leg 20A from the extended position shown in FIG. 5, the user merely pushes lock element 50 to the left, as viewed in FIG. 5, against the force of spring 56 until bifurcated end is moved so that rod 42 is free of slot 52. Then, leg 20A is pivoted to the collapsed position and locking element 50 is released. When the cook-stove 10 is to be used and legs 20A are to be extended, each leg 20A is pivoted while locking element 50 is held by the user free of contact with rod 42 of leg 20A. When the rod 42 of leg 20A is in alignment with slot 52, the locking element 50 is released and, under the force of spring 56, moves to place rod 42 in slot 52 thereby securing the leg against pivotal movement.

In a construction of cook-stove 10, main support ring 12 was formed from a stainless steel rod having a 0.074 centimeter (0.1875 inches) in diameter and shaped into a ring of 4.72 centimeters (12 inches) in diameter while secondary support ring 14 was formed from a stainless steel rod having a 0.074 centimeters (0.1875 inches) diameter and shaped into a ring of 4.33 centimeters (11 inches) in diameter. The grill 16 was made from stainless steel rods with the ring made from a stainless steel rod having a diameter of 0.049 centimeters (0.125 inches), and the crossbars of steel rods of 0.025 centimeters (0.0625 inches) in diameter. The cook-stove 10 in a collapsed or folded condition had a total thickness of approximately 0.59 centimeters (1.5 inches) which illustrates the compactness of the cook-stove for ease of carrying. The fuel holder 18 is carried separately.

The fuel holder 18 shown in FIGS. 3 and 9 comprises a circular pan shaped body having a bottom and the annular tapered side wall 26. The body may be entirely of aluminum or be a laminated material having an inner surface of aluminum or other heat resistant and reflective material. The body may have an annular flange or lip portion 60 and, if the body is of thin aluminum, reinforced by a wire ring 62 attached to the flange by a suitable heat resistant adhesive. A plurality of steel wire 64 are disposed diametrically across the opening of the body and each is secured at their opposite ends to the wire ring 62 by welding or other suitable means. As shown in FIG. 9, flange 60 may be deformed to embrace wires 62 and 64. The wires 62 and 64 are tied together where they intersect by any suitable means such as wire loop 66. The wires 64 enable the removal of the fuel holder 18 when the latter and cook-stove 10 is hot from use. A disposable cardboard lid or cover 68 is suitably secured to flange 60 to retain fuel, such as charcoal lumps or briquettes 70, preferably impregnated with an ignitable petroleum-based flame accelerator, such as alchohol. While charcoal briquettes 70 are shown, the fuel could be jellied alcohol. The cover 68 functions to retain the fuel in the body portion of fuel holder 18 and to retard the vaporization of the flame accelerator from the fuel. The cover 68 is removed prior to the insertion of the fuel holder 18 in secondary support ring 14.

In the use of cook-stove 10, the cook-stove is removed from a stowage bag (not shown) of plastic or canvas. The user, next, merely pivots each leg 20 from the collapsed or folded position shown in FIG. 1 to the extended position shown in FIG. 4. In the case of cook-stove 10 having legs 20A, the legs 20A are pivotally moved to the point where locking element 50, retracted against the bias of spring 46 and released, indexes so that the bifurcated end thereof embraces rod 42 of the leg. With all of the legs 20 or 20A extended and set upon the surface where the cook-stove 10 is to be used, secondary support ring 14 falls out of meshing relationship with main support ring 12. To facilitate positioning cook-stove 10 on the surface where it is to be used, two handles 72 (similar to handle 64) are attached to main support ring 12. The grill 16 is pivoted by use of handle 24 to the dot-dash line open position shown in FIG. 3 and a fuel holder 18 with cover 68 removed therefrom is inserted in secondary support ring 14. The fuel 70 in the fuel holder 18 is now ignited and grill 16 moved to the horizontal position on main support ring 12.

After cooking, the fuel 70 may be allowed to burn-out and fuel holder 18 removed while hot from secondary support ring 12 with grill 16 in the vertical position shown in dot-dash lines in FIG. 3. If the fuel holder 18 is to be removed while still hot a suitable tool, similar to a buttonhook, can be hooked on the wires 64, at loop 66, and lifted from secondary ring 14. In the alternative, the user can reuse fuel holder 18 by adding fresh fuel 70 or other combustible fuel. After use, the cook-stove 10 can be collapsed to the position shown in FIGS. 1 and 2. If desired the entire cook-stove 10 can be immersed in water and washed. Following the washing or without the washing, the collapsed cook-stove 10 can then be reinserted in a stowage bag (not shown).

It is believed readily apparent that the present invention provides a collapsible picnic cook-stove 10 which is relatively inexpensive in construction. It is so constructed that it can be quickly and easily be made ready for use and collapsible for carrying. It is a cook-stove that is collapsible into a compact package. It also is a cook-stove that can utilize a prepackaged fuel holder which after use may be disposable.

Although but one embodiment of the invention has been illustrated and described in detail, it is to be expressly understood that the invention is not limited thereto. For example, secondary support ring 14 can have a polygonal configuration or other shape instead of being circular and be used in combination with a fuel holder 18 which has a similar geometric configuration so as to be receivable in and supported by the modified secondary support ring 14. Various other changes can be made in the arrangement of parts without departing from the spirit and scope of the invention as the same will now be understood by those skilled in the art.

What is claimed is:

1. A collapsible picnic cook-stove in combination with a fuel holder for burning fuel;
   a) a first support element defining an opening,
   b) leg means connected to said first support element for supporting in one position said first support element in spaced relationship with the surface on which the cook-stove is to be used and in another position lie in a plane substantially parallel with the plane of the opening of said first support element;
   c) a comestible support means supported by said first support element overlying said opening;
   d) a second support element for supporting said fuel holder;
   e) connecting means for interconnecting the second support element and the first support element so that the second support element is suspended below and in spaced relation to the comestible support means and said opening; and
   f) said connecting means including means for permitting said second support element to be moved from the position of suspension of the fuel holder to a position in nested relationship with said first support element.

2. The apparatus of claim 1 wherein said first support element is a first ring shaped member.

3. The apparatus of claim 1 wherein said second support element consists of a second ring-shaped member constructed and arranged to receive and support the fuel holder and allow removal of the latter.

4. The apparatus of claim 3 wherein said connecting means is a plurality of spaced chains.

5. The apparatus of claim 3 wherein said comestible support means is a grill.

6. The apparatus of claim 3 wherein said leg means comprises a plurality of spaced elongated elements each of which is pivotally connected to said first support element.

7. The apparatus of claim 2 wherein said first support element and said second support element are, respectively, a first and a second ring and wherein said second ring is of a smaller size than said first ring to facilitate nesting of the first and second rings.

8. The apparatus of claim 7 wherein said fuel holder is of circular, panshape and dimensioned to fit within said second ring and having means for engaging said second ring for support by the latter when said fuel holder is positioned within said second ring.

9. The apparatus of claim 7 wherein said connecting means is at least three spaced chains with each chain connected at opposite end portions to the first ring-shaped member and the second ring-shaped member, each of said chains having loosely interfitting links permitting the second ring-shaped member to be moved into nesting relationship with said first ring-shaped member.

10. A collapsible cook-stove assembly in combination with a fuel holding member for receiving a fuel for burning comprising
   a) a first support member having means defining an opening;
   b) a second support member;
   c) connecting means for connecting said second support member in spaced substantial parallelism to said first support member;
   d) said connecting means including means for permitting said first and second support members to be selectively moved into and out of nesting relationship with each other;
   e) said second support member having means for receiving and supporting said fuel holding member in spaced and substantial alignment with said first support member opening;
   f) a comestible holder connected to said first support member to overlie the opening of the first support member and in spaced relationship with the fuel holding member; and
   g) a plurality of leg elements with each connected to said first support member for movement from a folded position to an extended position for supporting the assembly on a surface for use.

11. The apparatus of claim 10 wherein the comestible holder is pivotally connected to said first support member so as to be selectively moved from said overlying position to a non-overlying position with respect to said opening of the first support member.

12. The apparatus of claim 11 wherein said comestible holder is a grill.

13. The apparatus of claim 10 wherein said first support member is a cincture defining said opening.

14. The apparatus of claim 13 wherein said cincture is a wire.

15. The apparatus of claim 10 wherein said second support member is a cincture.

16. The apparatus of claim 15 wherein said cincture is a wire.

17. The apparatus of claim 10 where said connecting means includes flexible means.

18. The apparatus of claim 17 wherein said flexible means is a plurality of chains.

19. The apparatus of claim 10 wherein said fuel holder member has contiguous walls and bottom to receive and retain therein fuel.

20. The apparatus of claim 10 wherein said second support is a wire ring and said fuel holder member is pie pan-shaped with a peripheral flange means.

* * * * *